Figure 1:
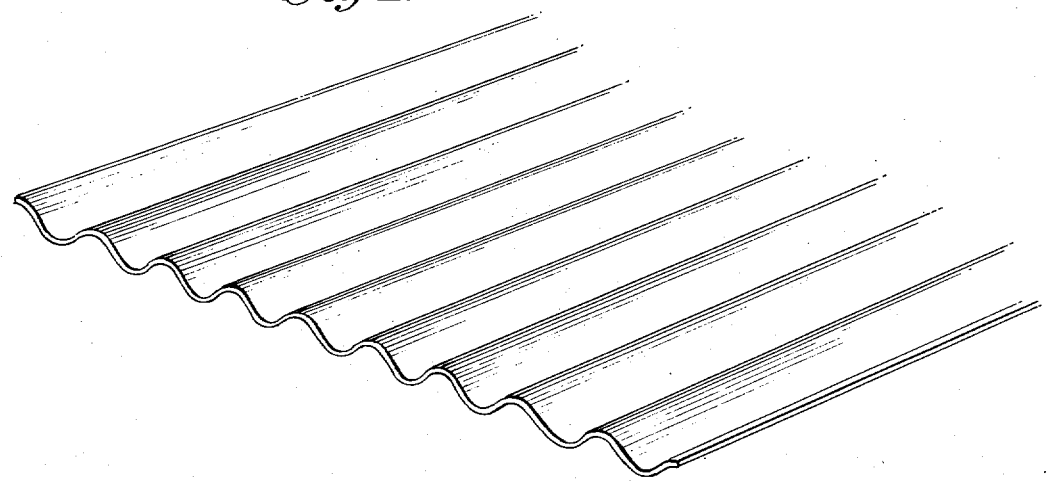

Feb. 9, 1937.   H. W. GREIDER ET AL   2,070,401
CORRUGATED SHEATHING
Filed Jan. 9, 1935

Patented Feb. 9, 1937

2,070,401

UNITED STATES PATENT OFFICE 2,070,401

CORRUGATED SHEATHING

Harold W. Greider and John K. Sherman, Jr., Wyoming, Ohio, assignors to The Philip Carey Manufacturing Company, a corporation of Ohio Application January 9, 1935, Serial No. 944

15 Claims. (Cl. 108—10)

This invention relates to corrugated sheathing and relates particularly to corrugated sheathing made of asbestos-Portland cement mixtures or other similar materials which are of a hard and brittle nature and have a compressive strength that is substantially greater than their tensile strength. Thus, for example, this invention is especially applicable in connection with the manufacture of corrugated sheathing from materials such as asbestos-cement mixture, having, for example, a modulus of rupture between about 3000 and about 10,000 lbs. per square inch. While corrugated sheathing is usually made of asbestos-cement mixtures, certain features of this invention are applicable to corrugated sheathing made of other materials having similar or analogous physical properties, such as glass or cast iron.

Corrugated asbestos-cement sheathing, for example, is used as a roofing and siding material, especially in marine and industrial atmospheres. Corrugated cement-asbestos sheathing does not require painting, does not corrode and is verminproof.

The usual composition of cement-asbestos corrugated material is about 75% Portland cement and 25% asbestos fiber, by weight. Portland cement, which forms the greater part of the sheathing, is strong under compressive stress but is comparatively weak under tensile stress. A piece of corrugated sheathing made of Portland cement alone and placed on a roof between spaced supports would probably collapse under any substantial load. The asbestos fiber acts as a reinforcing agent, raising the tensile strength of the material. The asbestos-cement article is usually pressed in a hydraulic press to give it additional density and tensile strength and is cured for about thirty days or more before being offered for sale. Various other proportions of asbestos and cement may also be used in the manufacture of corrugated sheathing either with or without the presence of other fibrous, granular, or finely-divided materials and fillers and may be manufactured by any suitable method of manufacture such as the Hatschek or grout methods which are well known and need not be described herein.

In its chief uses as roofing and siding material, corrugated cement-asbestos sheathing is subject to two ordinary loads, namely, wind load and snow load. On the vertical side of a building, the total load is usually wind load. On a sloping roof, the total load may be a combination of wind load and snow load. Other special types of load are sometimes encountered, such as a man stepping or walking on a roof, or the presence of repair materials, broken tree branches, tools and the like on the roof.

It is desirable to have the corrugated cement-asbestos sheathing as strong as possible using a minimum of materials so that the weight and cost of the corrugated sheathing and of the supporting structure may be reduced as much as possible. It is also desirable in a given installation of corrugated sheathing that the safety factor be as high as possible, the safety factor being the ratio of the load necessary to break the sheathing to the load normally encountered by the sheathing. Due to the inherent characteristic of asbestos-cement mixture and other similar materials of having a low tensile strength in proportion to compressive strength, this type of roofing, as heretofore manufactured, has a pronounced tendency to rupture and break under load conditions, and the factor of safety is not adequate. This has resulted in roofing failures and even occasional serious accidents due to men falling through roofings, and the like. While the safety factor can be increased by making such roofings heavier, this results in prohibitive increase in cost of materials and in the necessary provision of supporting structures of increased strength and cost.

It is a purpose of this invention to greatly increase the strength of corrugated sheathing in its resistance to failure under loads without greatly increasing the weight per square foot thereof. Thus, according to this invention, it is possible to increase the safety factor for a particular installation of sheathing, using sheathing of a given weight per square foot, by as much as fifty to one hundred per cent. as compared with corrugated sheathings heretofore manufactured having a similar weight per square foot.

This invention was made as a result of prolonged experimental investigation of corrugated sheathings of different designs and proportions. The problems involved in the design of corrugated sheathing are extremely difficult due to the corrugated character of the roofing. No relationship known prior to this invention has been found that meets the requirements for corrugated sheathing. Certain aspects of this invention relate to dimensional and proportional relationships, not heretofore known which greatly improve upon the corrugated sheathing heretofore known and/or manufactured.

Figure 2:
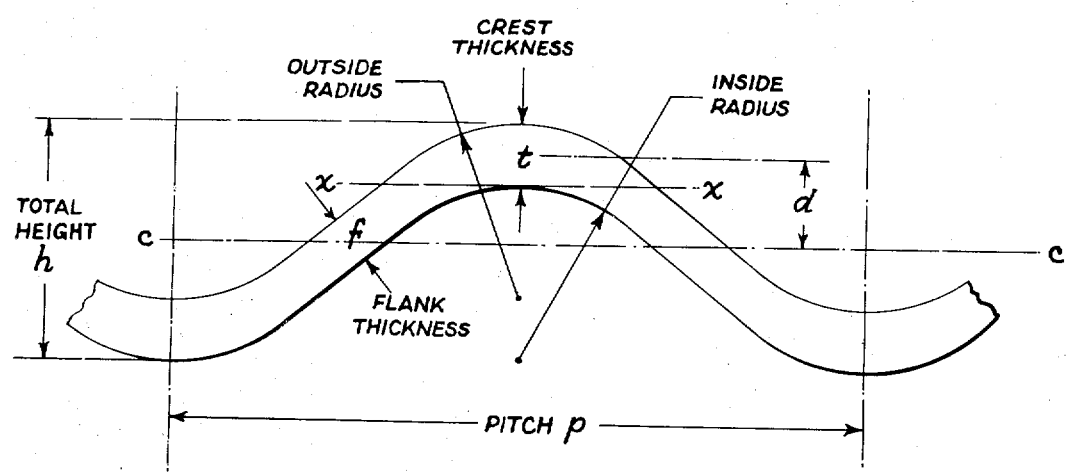

For the purpose of illustrating one embodiment of this invention, a specimen of corrugated sheathing will be described in connection with the accompanying drawing wherein Fig. 1 is a perspective view of a portion of corrugated sheathing which illustrates a type of sheathing to which this invention relates, and Fig. 2 is an end view of a piece of sheathing embodying this invention taken transversely of the corrugations.

In Fig. 2, only one complete corrugation is shown and it is to be understood that any desired number of similar corrugations may be employed. It also is to be understood that the invention includes corrugated sheathing having a cross-section either symmetrical or unsymmetrical about the center of gravity axis. Moreover, the inside and outside curvatures of the crests do not necessarily have to conform to portions of the circumference of a circle as shown in Fig. 2. Theoretically, there are definite advantages to be derived from an unsymmetrical section, but practical experiments have shown that these advantages are not attainable in an actual corrugated section which is decidedly unsymmetrical. However, in the following disclosures and claims, the features of the invention apply to the portions of an unsymmetrical section on either and/or both sides of the center of gravity axis.

In the accompanying drawing (Fig. 2) the distance from the crest of one corrugation to the next adjacent crest on the same side of the center of gravity axis of the sheathing is known as the pitch ($p$). The distance between crests on opposite sides of the center line as taken perpendicularly to the center of gravity axis is the total height ($h$). The thickness ($t$) of the crest of each corrugation is taken perpendicularly to the center of gravity axis. The flank thickness ($f$) is measured as a line which is the minimum distance between the flank walls. The distance ($d$) shown on the drawing is the distance from the center of gravity axis to the midpoint of the crest between the top and bottom curvatures of the crest.

In the embodiment of this invention shown in the accompanying drawing (Fig. 2) the corrugations may have approximately the following dimensions:

Example I

| | Inches |
|---|---|
| Pitch | 5 |
| Crest thickness | .45 |
| Flank thickness | .35 |
| Total height | 1.75 |
| Inside radius of crest | 1.25 |
| Outside radius of crest | 1.25 |

Corrugated sheathing having approximately the relative proportions and dimensions above given, especially when made from a material having a modulus of rupture of from about 3,000 to 10,000 has been found to have greatly increased load supporting strength as compared with corrugated sheathings heretofore known having approximately the same weight of materials per square foot. When the corrugated sheathing having the dimensions above given is made from a mixture of 75% Portland cement and 25% asbestos fiber and is molded under pressure, the weight thereof after curing and drying is approximately four pounds per square foot and it has a modulus of rupture of approximately 5,000. Corrugated sheathing made of such material and having the dimensions above given results in a highly satisfactory product which is much superior to other types now on the market of approximately the same weight and material.

With the corrugated sheathing having the relative dimensions above given, it is a particular advantage thereof, that the resistance to splitting longitudinally of the corrugations is substantially greater than the resistance to breaking across the corrugations, while the resistance to breaking across the corrugations is also very substantially increased over that of corrugated sheathings which have been made heretofore and which have not had the dimensional proportions which are disclosed herein. This results from a more effective distribution of the material in the section in respect to supporting the loads which may be imposed on the corrugated sheathing. The improved safety factor under load is a valuable feature secured by the practise of this invention.

While it has been stated that the corrugated sheathing above described weighs approximately four pounds per square foot, it is to be understood that with the dimensions given, the weight per square foot will vary with materials having different densities. Even asbestos-cement mixtures have somewhat different densities depending on the amount of moisture retained therein, the type of cement used, the forming pressure used, and the relative proportions of asbestos and cement. Asbestos-cement mixtures used according to this invention in a sheathing having the foregoing dimensions or approximately these dimensions preferably weigh from about 3.0 to 5.0 pounds per square foot. From another aspect, it may be stated that sheathing of the foregoing dimensions is of especial advantage in connection with materials having a modulus of rupture of from about 3,000 to about 10,000.

It is to be understood that of the dimensions given in Example I the pitch, top thickness and total height play the most important part in cooperating to produce a superior sheathing according to this invention. Thus a corrugated section having the following dimensions falls within the scope of this invention.

Example II

| | Inches (approximate) |
|---|---|
| Pitch | 5 |
| Crest thickness | .45 |
| Total height | 1.75 | although preferably the flank thickness is to be not greater than the top thickness and further advantages are achieved when the flank thickness is somewhat less than the crest thickness.

It is also to be understood that advantages according to this invention are achieved even though there is some variation in the relative proportions given as illustrated in the following example.

Example III

| | Inches |
|---|---|
| Pitch | 3.5 to 6.5 |
| Crest thickness | .3 to .5 |
| Total height | 1.5 to 2.0 | in sheathing in which preferably more than about fifty per cent. of the total transverse cross-sectional area is outside of lines parallel to the center of gravity axis and tangent to the inside curvature of the corrugations. (One of such lines is indicated as $x$—$x$ on the accompanying drawing Fig. 2.)

Another example may also be given.

Example IV

| | Inches |
|---|---|
| Pitch | 3.5 to 6.5 |
| Crest thickness | .3 to .5 |
| Total height | 1.5 to 2.0 | the flank thickness being not substantially greater than the crest thickness and being preferably substantially less than the top thickness.

Examples II, III and IV are especially applicable in connection with asbestos-cement sheathing weighing about 3.0 to 5.0 pounds per square foot. Moreover, it is also preferable for the angle that the flank of the corrugations makes with the center of gravity axis to be between about 35° and 55°. Still more improved results are obtained when the flank angle is between 40° and 55°. More generally, certain advantages of this invention are realized when the angle that the flank makes with the center of gravity axis is within the ranges above given and/or is preferably above about 40° and when more than about fifty per cent. of the total transverse cross sectional area of the sheathing is outside of lines that are parallel to the center of gravity axis and are tangent to the inner curvature of the crests.

In the foregoing, it has been mentioned that there is a tendency of corrugated sheathing under load to break across the corrugations and that there is likewise a tendency of corrugated sheathing to split longitudinally of the corrugations. Breakage in either of these directions results in a failure of the sheathing. In developing improved sheathing according to this invention, one of the problems that was involved was the ascertainment of the structural features that have particular bearing upon the two types of sheathing failure and the development of relationships which take both of these types of failure into consideration. As a result of this work, a formula has been developed which illustrates the relationship of the dimensional components that contribute to the load-bearing strength of corrugated sheathing. While the formula is somewhat arbitrary and empirical in character, it has been checked against the performance of actual specimens of corrugated sheathing and has been found correct within quite close limits. The formula is the product of certain factors as follows:

Per cent. of cross section area above lines that are parallel to the center of gravity axis and that are tangent to the inner curvatures of the crest portions of the section ($x$) (One-half the distance normal to the center of gravity axis between the midpoints of thickness at the top of crests on opposite sides of the center of gravity axis)$^2$ $$(x) \frac{(\text{Average crest thickness})^2}{\text{Corrugation pitch}}$$

Or more briefly using symbols, the formula is $$\frac{a}{A} \times 100 \times d^2 \times \frac{t^2}{p}$$

wherein A is the total transverse sectional area of the corrugated sheathing and $a$ is the cross sectional area of the sheathing at the crests above lines that are parallel to the center of gravity axis and that are tangent to the inner curvature of the crests. The other symbols $d, t$ and $p$ have been defined above.

The values of $a$ and A may be computed as follows: By laying out one corrugation of the section on cross section paper to any suitable scale, drawing in the proper lines, and counting the squares in each area concerned. A is found by the total number of squares in the part of one corrugation above the neutral axis, multiplied by the proper scale factor. $a$ is found in a similar manner.

The unit of length used in calculating results from the above formula is the inch and all limiting values set forth in the specification and claims are based on this unit. Modulus of rupture values are expressed as pounds per square inch. Weight of corrugated sheathing is stated as pounds per square foot of effective area.

In the foregoing formula, the expression $$\frac{a}{A} \times 100 \times d^2$$

has special applicability to resistance to breakage across the corrugations, while the expression $$\frac{t^2}{p}$$

has special applicability to resistance of the sheathing to splitting longitudinally of the corrugations. Thus not only is the formula as a whole important, but also from certain view points the components thereof having applicability to resistance to breaking across the corrugations and to resistance to splitting longitudinally of the corrugations are also of importance, especially in relation to each other.

With corrugated sheathing having the dimensions given in Example I using the foregoing formula, the resultant of the various dimensional components is as follows:

$$\left(\frac{a}{A} \times 100 \times d^2\right)\left(\frac{t^2}{p}\right) = (23.0)(.0404) = .93$$

It is apparent and has been pointed out above that this invention is not limited to corrugated sheathing having the dimensions and weight per square foot set forth in Example I. Cement-asbestos sheathing, for example, weighing about 4.0 lbs. per square foot and having relative proportions so that the value of the expression $$\frac{a}{A} \times 100 \times d^2 \times \frac{t^2}{p}$$

is .72 or above is to be regarded as being within the scope of this invention and preferably when likewise the value of $$\frac{a}{A} \times 100 \times d^2$$

is 20 or above and the value of $$\frac{t^2}{p}$$

is .036 or above. Also the embodiment of such relative proportions in asbestos-cement sheathing having a weight of about 3.0 to 5.0 pounds per square foot is to be regarded as a preferable construction according to this invention. For this and other types of sheathing, such proportions when embodied in sheathing having an average thickness of 0.25″ to about 0.60″ and a modulus of rupture of from about 3000 to about 10,000 affords preferred construction.

In order to make the above formula applicable to sheathing made from material of density different from that of asbestos-cement, or for sheathing of varying weights per square foot made from asbestos-cement, i. e., greater or less than 4.0 lbs. per square foot, the above formula is adapted to the requirements by expressing the minimum value in terms of a constant (0.18) multiplied by the weight per square foot (W) of the corrugated sheathing. The expression then becomes $$\frac{a}{A} \times 100 \times d^2 \times \frac{t^2}{p} = 0.18W \ (minimum)$$

and corrugated cement-asbestos sheathing having a value, calculated from the formula, which exceeds 0.18W is to be regarded as being within the scope of this invention. Moreover, it is preferable not only that the value of the expression as a whole be greater than the minimum 0.18W but also that the component thereof $$\frac{a}{A} \times 100 \times d^2$$

be greater than a minimum of 20 and that the expression $$\frac{t^3}{p}$$

be greater than a minimum of .009W. Thus, corrugated sheathing having a weight of 3.0 lbs. per square foot and such dimensional proportions that the value of the expression $$\frac{a}{A} \times 100 \times d^2 \times \frac{t^3}{p}$$

is 0.54 (0.18×3.0) or greater embodies the advantages obtainable by using the principles disclosed in this application. Likewise, corrugated sheathing weighing 5.0 lbs. per square foot and having such dimensional proportions that the value of the above expression exceeds 0.90 (0.18×5.0) is to be regarded as an embodiment of our invention.

The foregoing description of this invention has special applicability to corrugated sheathing intended primarily for roofing and siding purposes. It is to be understood, however, that the principles which have been developed according to this invention are applicable to corrugated sheathings used for other purposes. Improved construction of this invention is afforded when $$\frac{t^3}{p}$$

is greater than .036 and preferred results are achieved when likewise the value of $$\frac{a}{A} \times 100$$

is greater than 50, and the flank angle is greater than 40°, in corrugated sheathing weighing about 4.0 lbs. per square foot. More generally for corrugated sheathing of different material requirements the value of $$\frac{t^3}{p}$$

should be greater than .009W (W being pounds per square foot) with preferred results being achieved when likewise the value of $$\frac{a}{A} \times 100$$

is greater than 50 and/or the flank angle is greater than 40°

The corrugated sheathing having the relative proportions and dimensions hereinabove given has been found by experiment to have greatly increased load-bearing strength over any corrugated sheathing heretofore known and/or manufactured. According to this invention, it is possible to make corrugated asbestos-cement roofing, for example, which has a safety factor under load which is from 50% to 100% greater than corrugated asbestos-cement roofing heretofore manufactured without increasing the weight per square foot or changing the composition of the material or changing the supporting structure for the roofing in any way. The remarkable and unexpected character of this invention is therefore apparent.

The relationships which result in the improvements of this invention have been set forth above. Some of these relationships are as aforesaid of a somewhat empirical character but have been found by experiment to be substantially correct. As previously stated, these relationships were not known prior to this invention, as known formulas were found by experiment to be far from applicable to corrugated sheathing in determining or predicting the load-bearing strength thereof. Some of the relative proportions and dimensions given above represent more or less ideal conditions. It is apparent, however, that ideal conditions can be departed from somewhat while still achieving in relatively large degree marked improvement over prior art structures. Consequently, the relationships which result in the advantages of this invention have been stated in expressions having somewhat varying scope so as to distinguish permissible from preferable conditions and so as to give instructions whereby minor modifications can be made as desired while still achieving the improvements covered by this invention.

Corrugated sheathing embodying the features and improvements resulting from this invention is defined in the following claims when read in the light of the foregoing description.

We claim:

1. Corrugated asbestos-cement sheathing having a pitch of approximately 5 inches, a crest thickness of approximately .45 inch, a flank thickness of approximately .35 inch, a total height of approximately 1.75 inches, an inside radius of crest of approximately 1.25 inches, and an outside radius of the crest approximately 1.25 inches.

2. Corrugated sheathing having a pitch of about 3.5 to about 6.5 inches, composed of material having a modulus of rupture of about 3,000 to about 10,000 pounds per square inch, having a crest thickness of about 0.25 to about 0.60 inch, a total height of about 1.5 to about 2.0 inches, and at least about 50% of the transverse cross-sectional area of the sheathing being outside of lines parallel to the center of gravity axis and tangent to the inner curvatures of the corrugations.

3. Corrugated sheathing made of material having compressive strength substantially greater than tensile strength, a pitch of about 3.5 to about 6.5 inches, a total height of about 1.5 to about 2.0 inches, a crest thickness of about .3 to about .5 inch, and at least about 50% of the transverse cross-sectional area of the sheathing being outside of lines parallel to the center of gravity axis and tangent to the inner curvatures of the corrugations, the angle of the flank of the corrugations with respect to the center of gravity axis being between about 35° and about 55°.

4. Corrugated asbestos-cement sheathing having a pitch of about 3.5 to about 6.5 inches, a crest thickness of about .3 to about .5 inch, a total height of about 1.5 to about 2.0 inches, more than about 50% of the transverse cross-sectional area of the sheathing being outside of lines parallel to the center of gravity axis of the sheathing and tangent to the inner curvature of the corrugations.

5. Corrugated asbestos-cement sheathing weighing about 3.0 to about 5.0 pounds per square foot characterized by having such relative dimensional proportions that the expression $$\frac{a}{A} \times 100 \times d^2 \times \frac{t^2}{p}$$

has a value greater than about 0.18W, (a) being the transverse cross-sectional area of the sheathing outside of lines that are parallel to the center of gravity axis and are tangent to the inner curvature of the crests, (A) being the total transverse cross-sectional area of the sheathing, (d) being the distance from the center of gravity axis of the sheathing to the midpoint of the thickness of the crests, (t) being the thickness of the crests, (p) being the pitch, and W being the weight in pounds per square foot.

6. Corrugated asbestos-cement sheathing characterized by having such relative dimensional proportions that the expression $$\frac{a}{A} \times 100 \times d^2 \times \frac{t^2}{p}$$

has a value greater than about 0.18W, (a) being the transverse cross-sectional area of the sheathing outside of lines that are parallel to the center of gravity axis and are tangent to the inner curvature of the crests, (A) being the total transverse cross-sectional area of the sheathing, (d) being the distance from the center of gravity axis of the sheathing to the midpoint of the thickness of the crests, (t) being the thickness of the crests, (p) being the pitch, and W being the weight in pounds per square foot, the angle of the flank of the corrugations with respect to the center of gravity axis being between about 35° and about 55°.

7. Corrugated sheathing having an average thickness of about 0.25" to about 0.60" and composed of material having a modulus of rupture of about 3,000 to about 10,000, characterized by having such relative dimensional proportions that the expression $$\frac{a}{A} \times 100 \times d^2 \times \frac{t^2}{p}$$

has a value greater than about 0.18W, (a) being the transverse cross-sectional area of the sheathing outside of lines that are parallel to the center of gravity axis and are tangent to the inner curvature of the crests, (A) being the total transverse cross-sectional area of the sheathing, (d) being the distance from the center of gravity axis of the sheathing to the midpoint of the thickness of the crests, (t) being the thickness of the crests, (p) being the pitch, and W being the weight in pounds per square foot.

8. Corrugated sheathing made of material having a modulus of rupture of about 3,000 to about 10,000 characterized by having such dimensional proportions that the expression $$\frac{a}{A} \times 100 \times d^2$$

has a value greater than about 20, the expression $$\frac{t^2}{p}$$

has a value greater than about .036 and the expression $$\frac{a}{A} \times 100 \times d^2 \times \frac{t^2}{p}$$

has a value greater than about 0.72, (a) being the transverse cross-sectional area of the sheathing outside of lines that are parallel to the center of gravity axis and are tangent to the inner curvature of the crests, (A) being the total transverse cross-sectional area of the sheathing, (d) being the distance from the center of gravity axis of the sheathing to the midpoint of the thickness of the crests, (t) being the thickness of the crests, (p) being the pitch, the angle of the flank of the corrugations with respect to the center of gravity axis being between about 35° and about 55°.

9. Corrugated asbestos-cement sheathing weighing about 3.0 to about 5.0 pounds per square foot characterized by having such dimensional proportions that the expression $$\frac{a}{A} \times 100 \times d^2$$

has a value greater than about 20, the expression $$\frac{t^2}{p}$$

has a value greater than about .009W and the expression $$\frac{a}{A} \times 100 \times d^2 \times \frac{t^2}{p}$$

has a value greater than about 0.19W (a) being the transverse cross-sectional area of the sheathing outside of lines that are parallel to the center of gravity axis and are tangent to the inner curvature of the crests, (A) being the total transverse cross-sectional area of the sheathing, (d being the distance from the center of gravity axis of the sheathing to the midpoint of the thickness of the crests, (t) being the thickness of the crests, (p) being the pitch, and W being the weight in pounds per square foot.

10. Corrugated sheathing having an average thickness of about 0.25" to about 0.60" and composed of material having a modulus of rupture of about 3,000 to about 10,000, characterized by having such dimensional proportions that the expression $$\frac{a}{A} \times 100 \times d^2$$

has a value greater than about 20, the expression $$\frac{t^2}{p}$$

has a value greater than about .009W and the expression $$\frac{a}{A} \times 100 \times d^2 \times \frac{t^2}{p}$$

has a value greater than about 0.18W (a) being the transverse cross-sectional area of the sheathing outside of lines that are parallel to the center of gravity axis and are tangent to the inner curvature of the crests, (A) being the total transverse cross-sectional area of the sheathing, (d) being the distance from the center of gravity axis of the sheathing to the midpoint of the thickness of the crests, (t) being the thickness of the crests, (p) being the pitch, and W being the weight in pounds per square foot.

11. Corrugated asbestos-cement sheathing characterized by having the angle of the flank of the corrugations with respect to center of gravity axis between about 40° and about 55°, the value of $$\frac{t^2}{p}$$

greater than about .009W and the value of $$\frac{a}{A} \times 100$$

greater than about 50, (a) being the transverse cross-sectional area of the sheathing outside of lines that are parallel to the center of gravity axis and are tangent to the inner curvature of the crests, (A) being the total transverse cross-sectional area of the sheathing, (t) being the thickness of the crests, (p) being the pitch, and W being the weight in pounds per square foot.

12. Corrugated sheathing made of material having compressive strength substantially greater than tensile strength characterized by having such dimensional proportions that more than fifty per cent. of the total transverse cross-sectional area of the sheathing is outside of lines that are parallel to the center of gravity axis and are tangent to the inner curvature of the crests, the angle of the flank of the corrugations with respect to the center of gravity axis being greater than about 40°.

13. Corrugated asbestos-cement sheathing weighing about 3 to 5 pounds per square foot characterized by having a pitch of about 3.5 to about 6.5 inches, a total height of about 1.5 to about 2.0 inches, and a crest thickness of about .3 to about .5 inch, the angle of flank of the corrugations with respect to the center of gravity axis being between about 35° and about 55° and the flank thickness being not greater than the top thickness.

14. A corrugated sheathing made of material having a modulus of rupture of about 3,000 to about 10,000 and characterized by having a pitch of about 3.5 to about 6.5 inches, a total height of about 1.5 to about 2.0 inches, and a crest thickness of about .3 to about .5 inch, the angle of flank of the corrugations with respect to the center of gravity axis being between about 35° and about 55° and the flank thickness being less than the top thickness.

15. Corrugated sheathing made of material having compressive strength substantially greater than tensile strength, a pitch of from 3.5 to 6.5 inches, and a thickness not greater than 0.6 inch, characterized by having such dimensional proportions that more than 50 per cent. of the total transverse cross-sectional area of the sheathing is outside of lines parallel to the center of gravity axis and tangent to the inner curvature of the crests, the angle of the flank of the corrugations with respect to the center of gravity axis being between about 40° and 55°.

HAROLD W. GREIDER.
JOHN K. SHERMAN, Jr.

CERTIFICATE OF CORRECTION.

Patent No. 2,070,401.   February 9, 1937.

HAROLD W. GREIDER, ET AL.

It is hereby certified that error appears in the printed specification of the above numbered patent requiring correction as follows:. Page 5, second column, line 25, claim 9, for "0.19W" read 0.18W; and line 30, same claim, for "(d" read (d); and that the said Letters Patent should be read with these corrections therein that the same may conform to the record of the case in the Patent Office.

Signed and sealed this 16th day of March, A.D. 1937.

(Seal)

Henry Van Arsdale
Acting Commissioner of Patents.

cross-sectional area of the sheathing outside of lines that are parallel to the center of gravity axis and are tangent to the inner curvature of the crests, (A) being the total transverse cross-sectional area of the sheathing, (t) being the thickness of the crests, (p) being the pitch, and W being the weight in pounds per square foot.

12. Corrugated sheathing made of material having compressive strength substantially greater than tensile strength characterized by having such dimensional proportions that more than fifty per cent. of the total transverse cross-sectional area of the sheathing is outside of lines that are parallel to the center of gravity axis and are tangent to the inner curvature of the crests, the angle of the flank of the corrugations with respect to the center of gravity axis being greater than about 40°.

13. Corrugated asbestos-cement sheathing weighing about 3 to 5 pounds per square foot characterized by having a pitch of about 3.5 to about 6.5 inches, a total height of about 1.5 to about 2.0 inches, and a crest thickness of about .3 to about .5 inch, the angle of flank of the corrugations with respect to the center of gravity axis being between about 35° and about 55° and the flank thickness being not greater than the top thickness.

14. A corrugated sheathing made of material having a modulus of rupture of about 3,000 to about 10,000 and characterized by having a pitch of about 3.5 to about 6.5 inches, a total height of about 1.5 to about 2.0 inches, and a crest thickness of about .3 to about .5 inch, the angle of flank of the corrugations with respect to the center of gravity axis being between about 35° and about 55° and the flank thickness being less than the top thickness.

15. Corrugated sheathing made of material having compressive strength substantially greater than tensile strength, a pitch of from 3.5 to 6.5 inches, and a thickness not greater than 0.6 inch, characterized by having such dimensional proportions that more than 50 per cent. of the total transverse cross-sectional area of the sheathing is outside of lines parallel to the center of gravity axis and tangent to the inner curvature of the crests, the angle of the flank of the corrugations with respect to the center of gravity axis being between about 40° and 55°.

HAROLD W. GREIDER.
JOHN K. SHERMAN, Jr.

CERTIFICATE OF CORRECTION.

Patent No. 2,070,401.   February 9, 1937.

HAROLD W. GREIDER, ET AL.

It is hereby certified that error appears in the printed specification of the above numbered patent requiring correction as follows:. Page 5, second column, line 25, claim 9, for "0.19W" read 0.18W; and line 30, same claim, for "(d" read (d); and that the said Letters Patent should be read with these corrections therein that the same may conform to the record of the case in the Patent Office.

Signed and sealed this 16th day of March, A.D. 1937.

(Seal)
Henry Van Arsdale
Acting Commissioner of Patents.

CERTIFICATE OF CORRECTION.

Patent No. 2,070,401.  February 9, 1937

HAROLD W. GREIDER, ET AL.

It is hereby certified that error appears in the printed specification of the above numbered patent requiring correction as follows: Page 5, second column, line 25, claim 9, for "0.19W" read 0.18W; and line 30, same claim, for "(d" read (d); and that the said Letters Patent should be read with these corrections therein that the same may conform to the record of the case in the Patent Office.

Signed and sealed this 16th day of March, A.D. 1937.

(Seal)

Henry Van Arsdale
Acting Commissioner of Patents.